United States Patent [19]

Lund et al.

[11] 4,197,476
[45] Apr. 8, 1980

[54] HOLDER FOR THE STATOR WINDING HEADS OF ELECTRIC MACHINES

[75] Inventors: Egon Lund, Sonderborg; Poul Petersen, Nordborg; Per G. Sorensen, Sonderborg; Sverre M. Borgen, Nordborg; Jorgen C. Stannow, Sonderborg, all of Denmark

[73] Assignee: Danfoss A/S, Nordborg, Denmark

[21] Appl. No.: 932,434

[22] Filed: Aug. 10, 1978

[30] Foreign Application Priority Data

Aug. 16, 1977 [DE] Fed. Rep. of Germany ....... 2736932

[51] Int. Cl.² .............................................. H02K 3/46
[52] U.S. Cl. .................................... 310/260; 310/194; 310/214; 336/197
[58] Field of Search ................. 310/71, 194, 214, 260, 310/43, 45, 42, 179, 180, 184; 336/197

[56] References Cited

U.S. PATENT DOCUMENTS

| | | | |
|---|---|---|---|
| 3,002,119 | 9/1961 | Lindstrom | 310/260 |
| 3,075,250 | 1/1963 | Strom | 310/260 UX |
| 3,768,152 | 10/1973 | Swanke | 310/43 |
| 3,984,712 | 10/1976 | Hill | 310/71 |
| 3,984,714 | 10/1976 | Grozinger | 310/43 |
| 4,053,800 | 10/1977 | Hanning | 310/260 |

FOREIGN PATENT DOCUMENTS

| | | | |
|---|---|---|---|
| 1128540 | 4/1962 | Fed. Rep. of Germany | 310/260 |
| 2415839 | 9/1975 | Fed. Rep. of Germany | 310/260 |
| 2555869 | 6/1977 | Fed. Rep. of Germany | 310/260 |

Primary Examiner—R. Skudy
Attorney, Agent, or Firm—Wayne B. Easton

[57] ABSTRACT

The invention relates to an electric machine such as a motor having a stator lamination packet with winding heads at opposite ends thereof. A cover for each or either winding head has inner fingers which extend into the grooves of the stator packet and outer fingers with wedge shaped portions which extend between the inner fingers in the installed position. The wedge shaped portions are resiliently mounted relative to the cover proper. The wedge shaped portions have one set of edges engageable with an end face of the stator packet and a second set of relatively inclined edges engageable with the underside of the associated winding head. Circumferentially arranged grooves in the wedge shaped portions hold a ring which biases the outer fingers radially inwardly to bunch the winding head into a predetermined confined space.

8 Claims, 3 Drawing Figures

HOLDER FOR THE STATOR WINDING HEADS OF ELECTRIC MACHINES

The invention relates to a holder for the stator winding heads of electric machines, wherein a cover ring covering the end of the winding head is provided with inner fingers insertable in grooves and outer fingers lying against the outside of the winding head.

In a known holder of this kind, a plastics-coated sheet metal ring has inner fingers extending along the inner periphery of the winding head and forming with their ends a groove closure, whereas the outer fingers lie against the outer periphery of the winding head. The fingers should be resilient and thereby hold the winding head together. However, since the skeins of the winding are not completely enclosed there is a danger that individual wires will not be engaged and lie, for example, on the lamination packet of the stator. In addition, the holder is liable to loosen gradually as a result of vibrations.

The invention is based on the problem of providing a holder of the aforementioned kind which can be applied easily, secured to the machine securely and automatically ensures that all the wires of the winding are embraced by the holder.

According to the invention, this problem is solved in that the outer fingers have a wedge at the free end, which wedge is held in the space between two grooves between the end face of the stator lamination packet and the winding head with the aid of a clamping ring embracing all the wedges.

With this construction, the wedges serve a multiple function. They engage under the skeins of the winding so that these are enclosed all round. When the wedges are pushed radially inwardly to reach their proper position, they automatically take with them all the wires at the outside, particularly those that lie on the stator lamination packet, and lift them into a position adapted to the rest of the winding head. The holder can be applied very simply. The wedges need merely be pushed radially inwardly and held in this position by the clamping ring. Loosening is then impossible even during vibrations or the like. The wedges are clamped at least at the thickest portion of the winding head between the windings and the stator lamination packet. The cover ring is thereby simultaneously pulled against the winding head and the winding head as a whole is formed cleanly. This applies particularly to windings made on automatic winding machines where the winding heads receive an as yet relatively unorderly shape by magnetic deformation or mechanical widening.

In a preferred embodiment, it is ensured that the outer fingers comprise between the wedge and cover ring a resilient section which is so bent outwardly in its rest position that the wedge faces associated with the winding head lie on a larger diameter than the winding head diameter at least at the free end. With this construction, the holder need merely be axially pushed over the winding head, whereupon all wedges are simultaneously displaced radially inwardly and held in this position by the clamping ring.

One obtains the least possible outward bending if the wedge faces associated with the winding head extend substantially parallel to the inner fingers in the rest position.

Desirably, the outer wedge face is provided with a groove for receiving the clamping ring. This particularly prevents sliding of the clamping ring from the wedge.

With particular advantage, the groove is formed between a projection extending at the foot of the wedge beyond the outer wedge face and a ramp raised over this wedge face. In this case the base of the groove is substantially at the level of the outer wedge face, i.e. on a comparatively large outer diameter. Consequently the periphery of the clamping ring need be contracted to a comparatively small extent to secure the position of the wedges in the desired manner.

With particular advantage, the outer wedge face adjoins the resilient section tangentially. In this way one obtains a slide face over which the clamping ring can be pushed until it snaps into the groove, the wedges being pressed radially inwardly during sliding. To enable the wedges to be pushed as far as possible radially inwardly in every case, the clamping ring may be peripherally contractible. It is therefore desirable for the clamping ring to be a simple wire ring. This can be readily made peripherally shorter when necessary by applying individual corrugations. These corrugations may be simultaneously applied with a tool or, depending on requirements, be applied individually at different positions of the periphery.

It is also favourable for abutment faces for the wedges to be provided beyond the lamination packet between the inner fingers. In this way a limiting position is prescribed for the wedges so that the latter do not excessively compress the winding head at its thickest portions and do not project inwardly beyond the inner diameter of the stator at the thinner portions of the winding head.

The abutment faces are advantageously set back radially inwardly in relation to the outer faces of the inner fingers. Each tip of the wedge is therefore associated with a depression so that there is also a certain amount of locking in the peripheral direction.

The cover ring, inner fingers and outer fingers can be made of one insulating injection moulded part. By means of three-dimensional deformation, this can be made sufficiently stiff in the region of the cover ring and resilient in the region of the outer fingers. Metal inserts or the like are generally not required. The injection moulded part can be made particularly easily from plastics material, preferably polybutylene terephthalate.

Further, the inner fingers can be connected to the cover ring by way of a stiffening cylinder. This combination gives such a stiff component that, even with excessive stressing of the clamping ring, there is no danger of the wedges pushing the inner fingers inwardly beyond the internal diameter of the stator.

The invention will now be described in more detail with reference to an example illustrated in the drawing, wherein.

Figure 1:
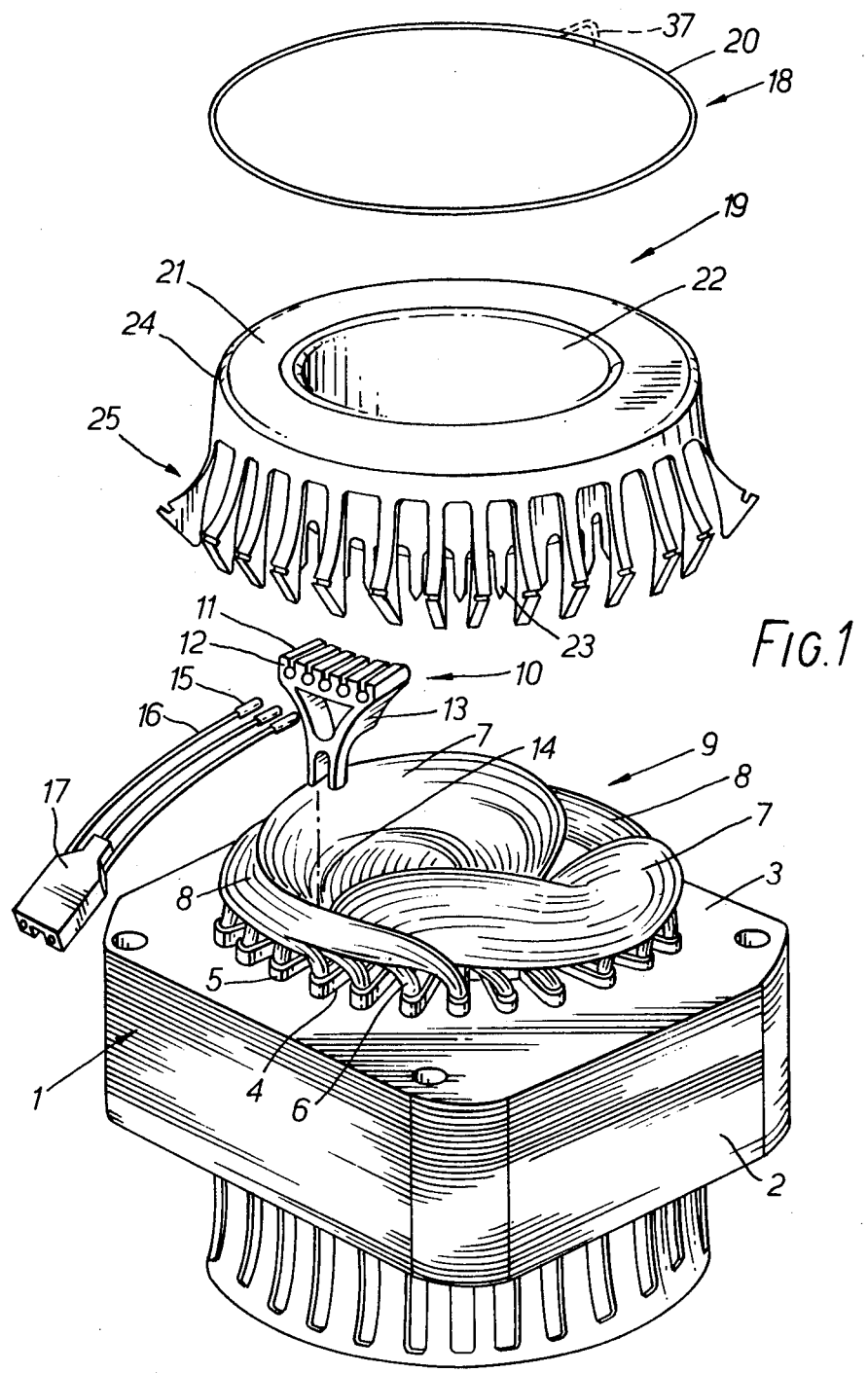
FIG. 1 shows the stator of a double pole asynchronous motor onto the one winding head of which the holder has already been placed, the other winding head being associated with the parts of the holder shown in an exploded view.

A stator 1 of a double pole asynchronous motor comprises a lamination packet 2 with an end face 3 and grooves 4 provided with groove insulation 5. Skeins 6 of two windings pass through the grooves, namely of the main winding which form inner portions 7 and of the auxiliary winding which form outer portions 8 of the winding head 9, these portions being offset by 90°.

A plastics member 10 comprises a fitting 11 with a plurality of grooves 12 and a plug-in foot 13 which can be plugged into a space 14 between two inner winding head portions 7 and within an outer winding head portion 8. Connecting elements 15 are inserted in the grooves, which elements connect the ends of the windings to connecting leads 16 leading to a plug connector 17. In this case the top of the fitting 11 is at substantially the same level as the top of the winding head 9.

A holder 18 consists of a plastics member 19 and a clamping ring 20. The latter may consist of a wire welded at its ends. The plastics member 19 comprises a cover ring 21 adjoined inwardly by a stiffening cylinder 22 which carries inner fingers 23 at the lower end whereas a downwardly extending peripheral edge 24 carrying outer fingers 25 is provided at the outside. The inner fingers 23 forming part of the groove closures engage in the grooves of the stator 2. The outer fingers 25 are disposed between the inner fingers in the peripheral direction so that they come to lie between two grooves when swung inwardly.

Figure 2:
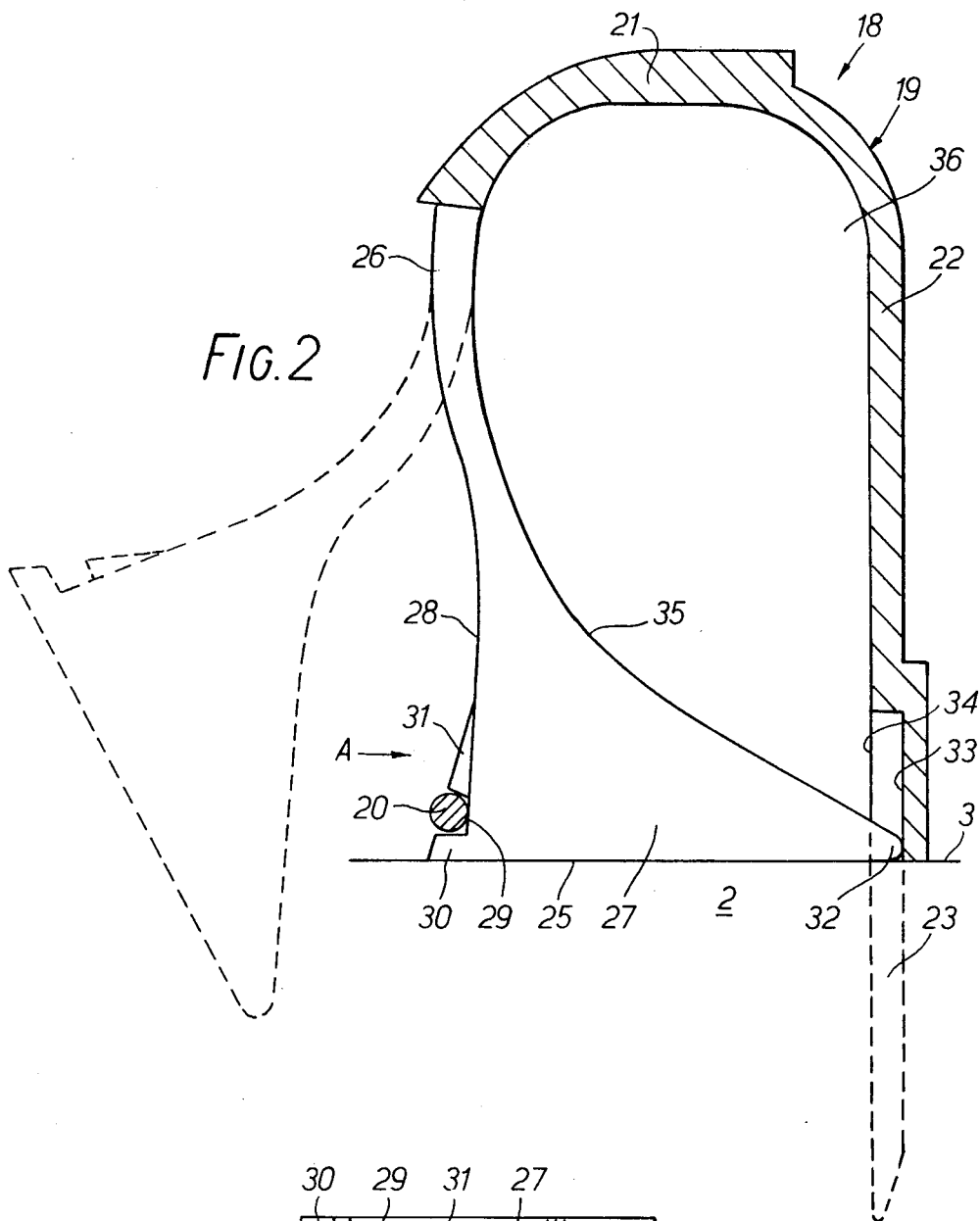
FIG. 2 is a section through one half of the holder.
Figure 3:
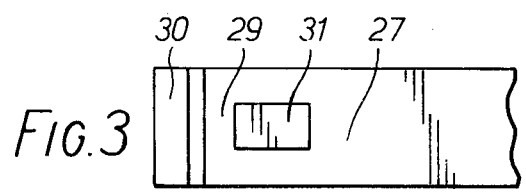
FIG. 3 is a plan view on the outer part face taken in the direction of the arrow A.

Each outer finger 25 consists of a resilient section 26 and a wedge 27. The outer face of the resilient section merges tangentially with the outer wedge face 28. A groove 29 for receiving the clamping ring 20 is formed between a projection 30 extending beyond the outer wedge face 28 and a ramp 31. The wedges 27 can be swung from the rest position shown in broken lines in FIG. 2 up to the position shown in full lines in FIG. 2, in which the tip 32 of the wedge lies against an abutment face 33 which is set back relatively to the outer face 34 of the inner fingers 23, so that there is formed a depression which also secures the wedge in the peripheral direction.

During assembly, the plastics member 10 is plugged into the space 14 between the winding head portions 7. The inner fingers 23 of the plastics member 19 is then somewhat introduced into the corresponding grooves until the tip 32 of the wedge is seated on the end face 3. In this case the wedge faces 35 confronting the winding head 9 and extending substantially parallel to the inner fingers 23 lie on a somewhat larger diameter than the outer diameter of the as yet unfinished winding head 9 so that the plastics member 19 can be readily pushed over the winding head. The clamping ring 20 is thereupon pressed downwardly to slide on the outer wedge face 28 and thereby swing the wedges 27 radially inwardly about the resilient section 26 until the clamping ring 20 snaps into the groove 29. During this pivotal motion, the tip 32 of the wedge continuously glides on the stator end face 3 so that, with the aid of the upper wedge face 35, all the wires disposed near the end face 3 are taken up and led into the inner space 36. If required, the clamping ring can be further contracted and thereby stressed in the peripheral direction by applying individual corrugations 37 until the wedges 27 have finally been led inwardly as far as is possible. In this position, the winding head 9 is well formed and securely held because, at least at the thicker portions of the winding head 9 where the parts of the main winding and the auxiliary winding are engaged, the winding head is clamped between the cover ring 21 and the upper wedge face 35.

As a plastics material for the member 19, various products are suitable, for example a polyester. Preferably, use is made of polybutylene terephthalate.

A conventional clip which can be circumferentially shortened with the aid of a tightening screw could also be used as a clamping ring. The holder is also suitable for other winding head shapes and for electric machines having a different number of poles and being of different construction.

What is claimed is:

1. An electric machine having a stator lamination packet with a central opening and grooves arranged circumferentially relative to said opening, said packet having a flat end face, a winding head adjacent said end face having skeins extending into said grooves, a cover ring for said winding head having a stiffening cylinder portion, a plurality of circumferentially arranged inner fingers extending from said cylinder portion and being insertable into said grooves, a plurality of circumferentially arranged outer fingers extending from said ring, said outer fingers each having a wedge shaped portion with a first edge engageable with said end face and a second relatively inclined edge engageable with the underside of said winding head, said wedge shaped portions being insertable in spaces between said grooves, and means biasing said outer fingers radially inward relative to said central opening.

2. An electric machine according to claim 1 wherein said means biasing said outer fingers is a clamping ring.

3. An electric machine according to claim 1 wherein said outer fingers have flexible sections connecting them to said cover ring.

4. An electric machine according to claim 1 wherein said wedge shaped portions are substantially parallel to said inner fingers in the installed position.

5. An electric machine according to claim 2 wherein said wedge shaped portions have grooves for receiving said clamping ring.

6. An electric machine according to claim 2 wherein the radially outer edges of said wedge shaped portions flare radially outwardly adjacent said end face to form ramp portions, said grooves being in said ramp portions.

7. An electric machine according to claim 1 wherein abutment means extend from said ring portion having surfaces between said inner fingers engageable to said wedge shaped portions.

8. An electric machine according to claim 7 wherein said surfaces of said abutment means are radially offset inwardly relative to said inner fingers.

* * * * *